United States Patent
Kuekes et al.

(10) Patent No.: US 7,511,725 B2
(45) Date of Patent: Mar. 31, 2009

(54) APPARATUS AND METHOD FOR PROVIDING A THREE-DIMENSIONAL MOVING IMAGE FROM A NON-FIXED PIXEL DISPLAY

(75) Inventors: Philip J. Kuekes, Menlo Park, CA (US); Wei Wu, Palo Alto, CA (US); Shih-Yuan Wang, Palo Alto, CA (US); R. Stanley Williams, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 649 days.

(21) Appl. No.: 11/128,085

(22) Filed: May 11, 2005

(65) Prior Publication Data

US 2006/0256143 A1    Nov. 16, 2006

(51) Int. Cl.
*G09G 5/02* (2006.01)

(52) U.S. Cl. .............................. 345/698; 345/6; 359/11; 359/279; 359/245

(58) Field of Classification Search .................... 359/11, 359/15, 22
See application file for complete search history.

(56) References Cited

U.S. PATENT DOCUMENTS

2004/0156407 A1*  8/2004  Beausoleil et al. ............ 372/43

* cited by examiner

*Primary Examiner*—Amr Awad
*Assistant Examiner*—Tony Davis (57) ABSTRACT

Embodiments of the invention provide a system and method for providing a three-dimensional moving image from a non-fixed pixel display. In one embodiment, a display having a plurality of pixels is provided, wherein at least one of the pixels is non-fixed and dynamically adjustable. In addition, a pixel controller is provided for controlling at least one non-fixed and dynamically adjustable pixel. The pixel controller for moving at least one of the pixels to a first extent to changing the phase of a first photon and to a second different extent to change the phase of a second photon.

24 Claims, 8 Drawing Sheets

APPARATUS AND METHOD FOR PROVIDING A THREE-DIMENSIONAL MOVING IMAGE FROM A NON-FIXED PIXEL DISPLAY

TECHNICAL FIELD

The present invention relates to the field of electronic displays, and more particularly to an apparatus and method for providing a three-dimensional moving image from a non-fixed pixel display.

BACKGROUND ART

Presently, electronic displays are used for watching television, as monitors for computers, as graphical user interfaces (GUIs), as well as on telephones, digital cameras, video recorders, picture frame displays, watches, etc. The utilization of electronic displays is still growing, and almost daily, new and better displays are being provided for utilization in the ever-growing consumer display market.

It is not uncommon for a person to spend several hours in a day viewing an electronic display. In some cases, the viewing is for entertainment purposes such as watching a television show, playing a video game, video taping a family event and the like. In other cases, the viewing is work related, such as viewing a computer monitor, a surveillance monitor, a heads up display, radar screen, cockpit information, and the like.

Because of the large electronic display market, electronic display providers are constantly making display advancements as well as upgrading present electronic displays. For example, cathode ray tube (CRT) displays have grown in size and significantly increased in quality. Moreover, due to the demand for increases in size while decreasing the weight, liquid crystal (LCD) and plasma displays have established themselves in the marketplace. Such LCD and plasma displays provide a very clear image with a reduced weight in comparison to similar size CRT displays.

Basically, for the right price, an electronic display can be manufactured to fit almost any user's size specifications. However, one of the downfalls of present CRT, LCD and plasma displays is that even with the advances of High Definition and digital signals, the display still only provides a two-dimensional (2-D) image. That is, the displayed image contains only wavelength (color) and position information. The limitations are even more noticeable on the smaller electronic displays such as the telephone, video recorder, personal digital assistant (PDA), watch, picture frame (e.g., a frame having an electronic display therein for presenting stills of digital photography), and the like, which are not high clarity displays.

Presently, holographic or three-dimensional (3-D) displays, which could provide the visual image of the electronic display in a 3-D format, are only capable of providing a 3-D effect if a user wears appropriate eyewear (e.g., colored lenses), or if the image is a static (non-changing) image such as the hologram on a bank card.

DISCLOSURE OF THE INVENTION

Embodiments of the invention provide a system and method for providing a three-dimensional moving image from a non-fixed pixel display. In one embodiment, a display having a plurality of pixels is provided, wherein at least one of the pixels is non-fixed and dynamically adjustable. In addition, a pixel controller is provided for controlling at least one non-fixed and dynamically adjustable pixel. The pixel controller for moving at least one of the pixels to a first extent to changing the phase of a first photon and to a second different extent to change the phase of a second photon.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Embodiments of the invention provide a system and method for providing a three-dimensional (3-D) moving image from a non-fixed pixel display. In one embodiment, the position of at least one pixel in a display is manipulated to provide a three-dimensional moving image. The capabilities of the display to provide three-dimensional (3-D) dynamic imagery is due to the addition of a phase component to the output light by changing the location of the pixel.

Conventional displays do not take advantage of the phase of light. Instead, conventional displays only consider wavelength (e.g., color) and the position (for example, location on a screen). As a result, they generate two-dimensional imagery; that is, an image having no depth and only a standard phase. Conventional holograms can provide a static three-dimensional image by utilizing the phase information to provide depth. However, as these images are static, they are not well suited to provide a moving 3-D image such as those provided by the displays described herein.

Figure 1:
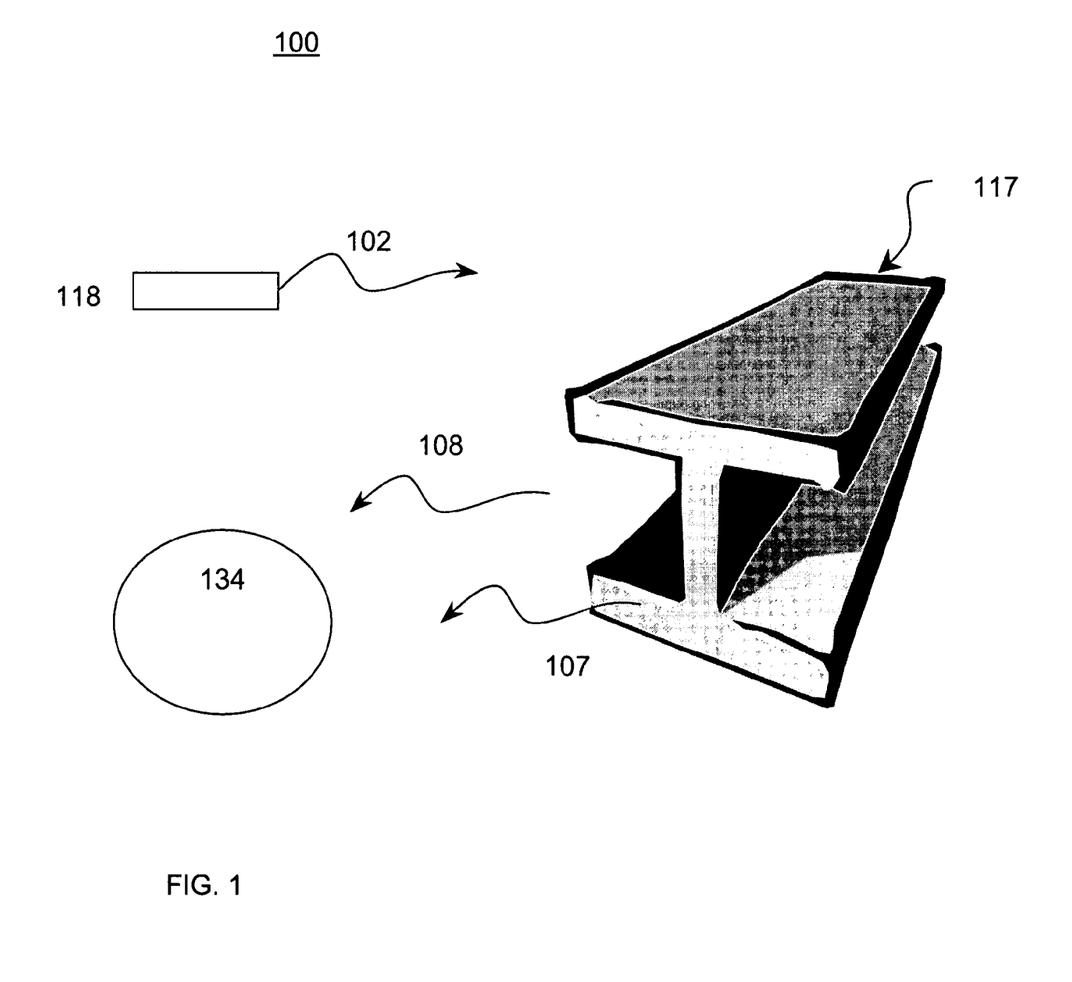
FIG. 1 is an exemplary embodiment for capturing phase information in accordance with one embodiment of the present invention.

Referring now to FIG. 1, a representation of one exemplary method for capturing photon phase information is shown. In one embodiment, to make a hologram, the object 117 is illuminated in the three standard display colors (e.g., red, blue and green 118). In other words, instead of the standard illumination of the object 117 used in standard recording, coherent lighting 118 of the object 117 is utilized. The coherent lighting 118 provides a light wave 102 having a well-defined phase on one particular frequency (e.g., either red, green or blue). In another embodiment, a single coherent light source is used to provide a monochromatic 3-D recording.

The phase information 107 and 108 are recorded after the emitted light 102 hits an individual part of an object 117 and bounces back 108 to a receiver or recorder 134. Depending on what and where the light wave (or photon) 102 hits, the light wave will acquire a little extra phase 108 on the return trip. In other words, each photon 102 being emitted and subsequently reflected will have a slightly different phase (e.g., photon 108 and photon 107) depending on just how far the photon traveled. The phases of the different photons is recorded when the photons are received at receiver 134.

Figure 2:
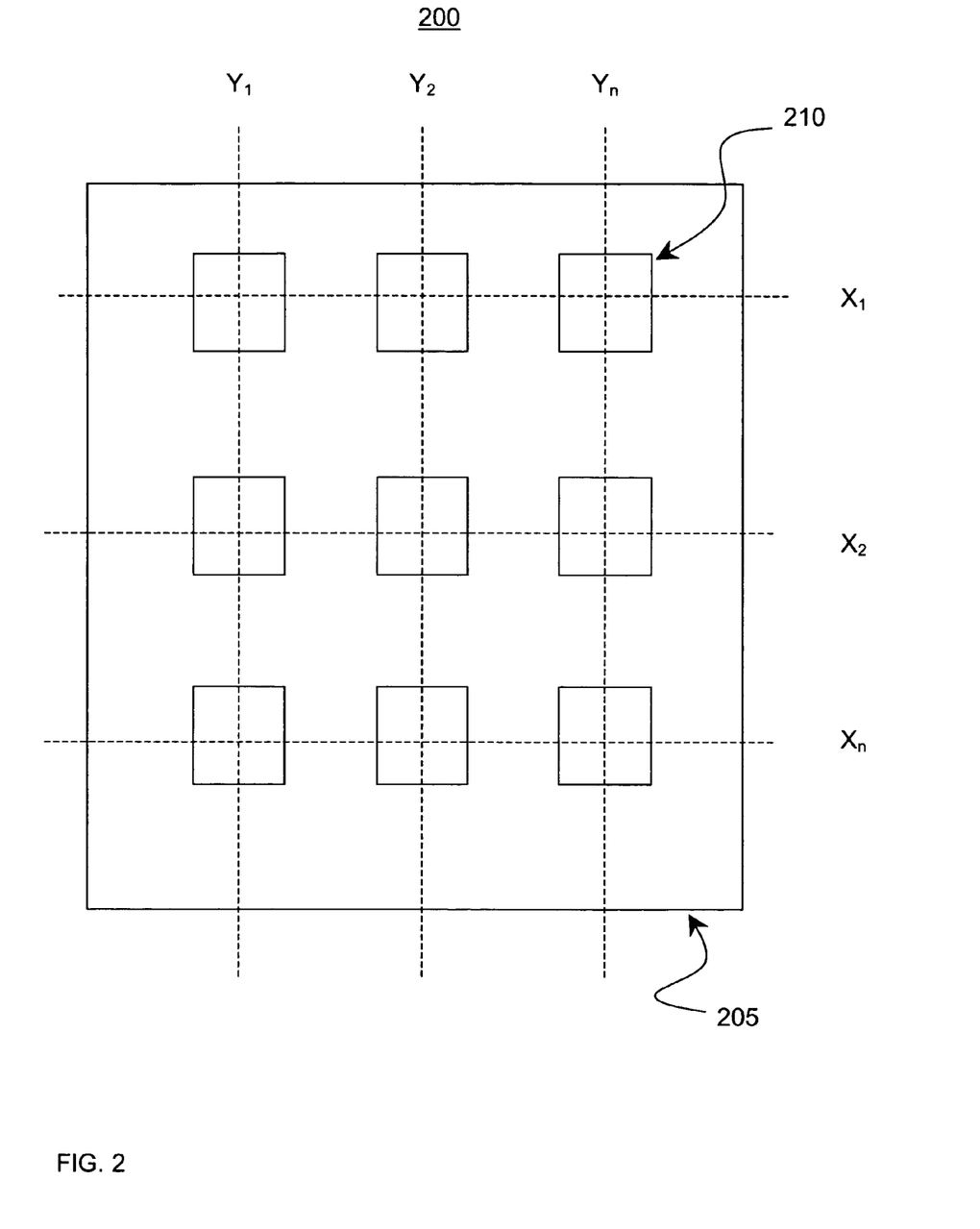
FIG. 2 is a front view diagram of an exemplary electronic display having a pixel grid in accordance with one embodiment of the present invention.

With reference now to FIG. 2, a diagram of an exemplary electronic display 200 having a pixel grid is shown in accordance with one embodiment of the present invention. The display 200 of FIG. 2 has only nine pixels for purposes of clarity and brevity. Display 200 will normally have many more pixels in a much more compact pattern. Display 200 includes a screen 205, and a plurality of pixels, one of which is shown as pixel 210. The location of the pixels can be defined using X coordinates and Y coordinates. For example, pixel 210 can be defined as having position $X_1$-$Y_n$.

To form the holographic display 200, at least a few of the pixels 210 (e.g., illuminated on a display, photograph) are formed such that when the emitted photons interact with the pixel 210 (either reflected back or transmitted through), a significant phase shift is realized by the photon. In other words, the pixel 210 provides the phase information to the photon thus adding the third dimension to the display. In one embodiment, the effective index of refraction of the pixel 210 is modified to provide the phase information.

In so doing, the present invention provides dynamic holographic imagery (e.g., changing 3-D images) on an electronic display. Moreover, due to the dynamic 3-D properties of the display, a viewer will be able to change a point of reference and the view of the hologram will also change. In general, the display 200 is three-dimensional because the photon's phase information (captured during the recording of the original image) is provided to the pixels 210, having modifiable effective indices of refraction, capable of providing the phase information to the passing photon thereby resulting in a 3-D dynamic presentation.

Modification of the Pixels' Effective Index of Refraction

Figure 3:
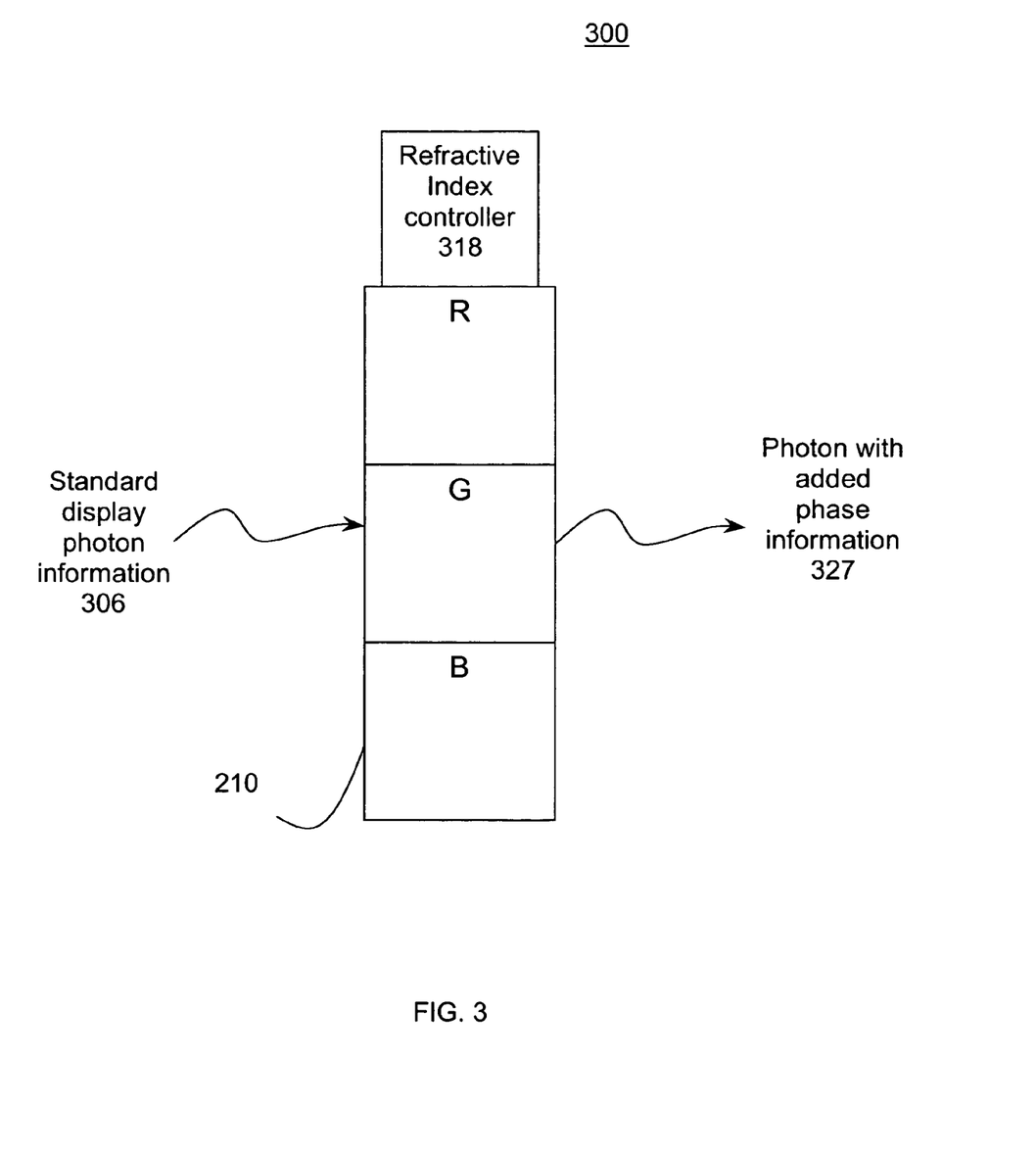
FIG. 3 is a side view diagram of an exemplary pixel with a modifiable effective index of refraction and phase controller in accordance with one embodiment of the present invention.

Referring now to FIG. 3, a side view diagram of an exemplary pixel with a modifiable effective index of refraction and refractive index controller 318 is shown in accordance with one embodiment of the present invention. In one embodiment, the effective index of refraction for the pixel 210 is realized by manufacturing the pixel 210 with a material having a controllable index of refraction, such as a slow light propagation material (e.g., an artificial composite material having electromagnetic induced transparency (EIT) qualities, alexandrite, and the like). Refractive index controller 318 is capable of changing the effective index of refraction of the slow light propagation material utilizing techniques established in well-known quantum physics models.

For example, the speed of light changes depending on the index of refraction of the material through which the light is traveling. When the speed of light changes due to the index of refraction, a phase shift is realized. Depending on the index of refraction of the material, the phase shift of the light accumulates until the light comes out of the material. For example, a lens from a pair of eyeglasses will provide a phase shift to the entire wave front passing through the lens.

By changing the index of refraction of the pixel 210, or a sub-pixel portion thereof, either by transmission or reflection (mirror), there is a realized phase shift. By changing the effective index of refraction for the pixel 210 (by electric field, light slowing material, electrochemical, or the like), the photon 306 will enter the pixel 210 as a standard 2-D display photon (e.g., having no corrected phase information) and come out of pixel 210 as a 3-D display photon 327 (e.g., having corrected phase information).

In one embodiment, the refractive index controller 318 modifies the effective index of refraction of the pixel 210 or sub-pixel portion, such that pixel 210 can provide the correct phase information to photon (or set of photons) 327. By utilizing the refractive index controller 318 to selectively modify the effective index of refraction of the pixel 210, the next photon (or next set of photons) passing through pixel 210 may receive different phase information, thereby generating a three-dimensional moving picture. In another embodiment, there is no refractive index controller 318 and the refractive index modification information of the pixel 210 is received from a different source, such as a second coherent light source (e.g., a laser beam).

As is well known in quantum mechanics, the index of refraction is understood for given materials. Therefore, the refractive index controller 318 will modify the effective index of refraction of pixel 210 in real time, for example, 30 times a second. In one embodiment, pixel 210 utilizes an artificial composite material having electromagnetic induced transparency (EIT) qualities. In general, a material that induces an EIT effect has a controllably changeable index of refraction capable of significantly changing the phase of light passing through the material that induces an EIT effect. In another embodiment, the slow light propagation material utilized for pixel 210 formation is alexandrite. In one embodiment, alexandrite is formed by doping a $BeAl_2O_4$ crystal with $Cr^{3+}$ ions, wherein the $Cr^{3+}$ ions replace the $Al^{3+}$ ions. Therefore, instead of a material (e.g., glass) having indices of refraction that produces very small phase shifts, by utilizing a material that induces the EIT effect (or alexandrite or the like), a significant, reversible, and modifiable phase shift is provided.

Operation

Figure 4:
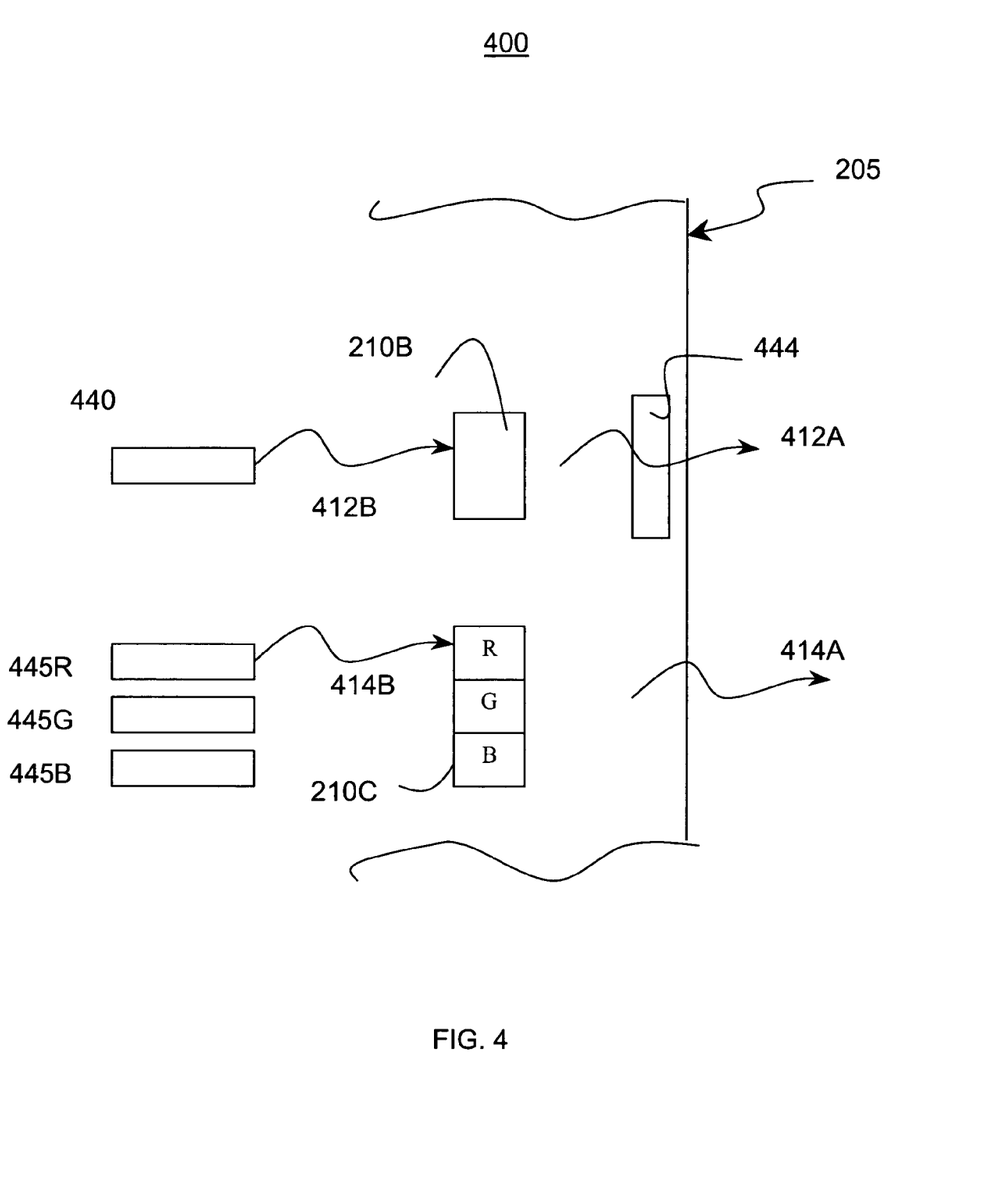
FIG. 4 is a side view diagram of a portion of an exemplary electronic display having a pixel grid with pixels of a slow light propagation material in accordance with one embodiment of the present invention.

Referring now to FIG. 4, a side view diagram of a portion of an exemplary electronic display 400 having a fixed pixel grid and screen 205 is shown in accordance with one embodiment of the present invention. In one embodiment, the electronic display 400 is similar in form and manufacture to a standard CRT or LCD display. However, unlike conventional CRT or LCD displays, at least one of the pixels (e.g., 210B-210C) has a modifiable effective index of refraction.

In one embodiment, single color light 440 (e.g., single wavelength, coherent light such as 412A and 412B) is provided to the pixel 210B. Moreover, in one embodiment the photon 412A travels through a phosphor layer 444 after the phase shift is achieved to provide different shades of color. In another embodiment, the pixel 210C includes a red sub-pixel portion, a green sub-pixel portion and a blue sub-pixel portion. In yet another embodiment, a plurality of coherent light sources (e.g., 445R, 445G and 445B) are utilized to provide photons (such as photon 414A and 414B) in the three standard display colors for the holographic moving image. In another embodiment, the holographic moving image is monochromatic.

In one exemplary operation, the pixel 210C having three sets of sub-pixel portions is illuminated by three separate coherent light sources (e.g., 445R, 445G and 445B). In another embodiment, a singe fast tuned light source 440 is used to illuminate the pixel 210B or the sub-pixels of pixel 210C. In other words, a fairly narrow coherent wavelength of light is input to the pixel (e.g., 210B-210C) resulting in reasonably coherent and monochromatic light with modified phase information being output from pixel 210B-210C. Coherent light is utilized because the slow light propagation material (e.g., material that induces an EIT effects, alexandrite, and the like) is tuned for specific and fairly narrow wavelengths, and coherent light ensures that no distorted phase information is provided to the photon.

Figure 5:
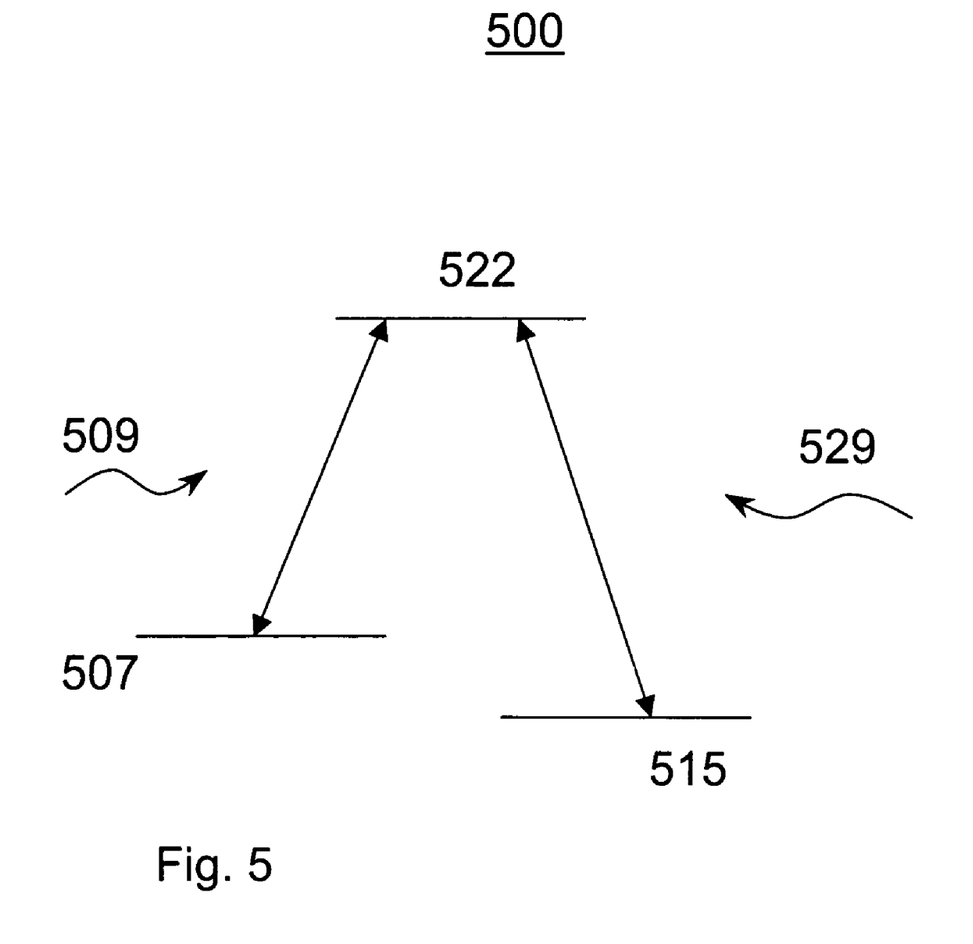
FIG. 5 is a schematic diagram of an electromagnetic induced transparency (EIT) atomic system in accordance with one embodiment of the present invention

With reference now to FIG. 5, a schematic diagram of an EIT atomic system is shown in accordance with one embodiment of the present invention. The EIT model of FIG. 5 is just one of a plurality of slow light propagation materials which may be used in conjunction with embodiments of the present invention. In one embodiment, the EIT atomic system includes a first quantum state 515, a second (or next level) quantum state 522 and an off-resonance quantum state 507.

In general, light is created and sent out of atoms and molecules as photons. Basically, when the photon 529 comes into contact with an electron at a first energy state 515, the electron at the first energy state 515 will absorb the photon 529 and move to another quantum energy state 522. Later, the electron at the second energy state 515 falls back to its pre-photon absorption state 515 and the photon 529 is re-emitted. That is, there is an absorption process followed by an emission process.

Quantum mechanically there is also a virtual absorption process. That is, if the energy of the photon 529 exactly matches the energy required by the electron at the first energy state 515 to reach the next energy level 522, for example, if the energy of the photon 529 is identically equal to the energy required to move the electron at the first energy state 515 to the next quantum state 522, then the energy will be absorbed by the electron and the electron will move to the next state 522. Moreover, the electron will stay for an amount of time before it falls back.

However, if the energy of the photon (e.g., photon 509) does not match the energy required by the electron at an off-resonance quantum state 507 for the electron to reach the next level (e.g., too little energy or too much energy), quantum mechanically it is still possible for the electron at the off-resonance quantum state 507 to absorb the photon 509. However, because the photon 509 is off-resonance, it will be absorbed only briefly by the electron and the electron will fall back to its off-resonance quantum state 507 quickly. In other words, according to quantum theory, the electron at the off-resonance quantum state 507 will raise its energy level briefly and then fall back down to its previous level. The photon 509 will be emitted from the electron and continue on its way. The given amount of time of absorption, although short, will cause a phase shift with respect to the photon.

From Heisenberg's uncertainty relations and principle, it is well known that a little energy uncertainty results in a large time uncertainty and vice-versa. Therefore, if the photon 509 is far from resonance, a lot of energy must be borrowed and therefore the photon 509 will be given back very quickly and the phase shift will be small. However, if the photon 509 is very close to resonance, almost exactly on resonance for the electron of energy level 515, then a very little energy can be borrowed for a long period of time, hence the speed of light slows way down, providing a very large and calculable phase shift.

For example, diamond over a short distance provides only a few percentage points of refraction, which provides only a very small phase shift. However, with a slow light propagation material, such as a material that induces an EIT effect, tuning the light source 509 to very near the resonance will produce a phase shift that is arbitrarily and controllably long.

Prior to the slow light propagation material, when approaching the resonance energy level 507, there was a very real probability that a slight energy shift or thermal vibration would allow the photon 509 to be absorbed and the electron would actually reach the next energy level 522. In other words, the photon would be absorbed and not necessarily or controllably re-radiated. Thus, for any ordinary, non-quantum engineered materials, when the photon energy is close to the resonance of the electron, the photon would arbitrarily get absorbed. In so doing, the amount of light drops exponentially as the light is attenuated.

Referring still to FIG. 5, in one embodiment, the material that induces the EIT effect is represented as a two-leg diagram, with a first leg having an electron in the ground state 515 and the second leg being the off-resonance level 507. When the coupling beam 509 is turned on with the probe beam 529 turned off, an eigenstate is realized. That is, the electron at ground state 515 remains in the ground state 515. By methodically increasing both the control strength 509 and probe strength 529 adiabatically, the electron will remain in the eigenstate.

In operation, a fairly intense probe beam 529 is shined at the material that induces the EIT effect while the coupling beam 509 also shines at the material that induces the EIT effect. In one embodiment, the coupling beam 509 is tuned to a wavelength that is just off-resonance (e.g., level 507) required for changing an electron from the 515 energy level to the 522 or next energy level. By providing the tuned coupling light source 509 at the material that induces the EIT effect, the probe 529 light becomes transparent to the material that induces the EIT effect. That is, the electron at energy level 515 never absorbs the photons from beam 529. However, the photons from light beam 529 are slowed. In so doing, a phase shift is introduced to the photon. In one embodiment, the refractive index controller 318 of FIG. 3 generates the coupling beam 509.

Thus, the electromagnetic induced transparency is realized and the photon from light source 529 passes right through the material that induces the EIT effect. It is quantum mechanically impossible for the photon from light source 529 to be absorbed by the electron. However, the slowing of the photon from light source 529 is demonstrated and calculable. In operation, the short leg is provided at not quite resonance but at different levels close to resonance to obtain the desired phase delay. In so doing, the phase delay becomes controllable and the light is effectively reemitted after the desired amount of time with the desired phase. Moreover, the photon never gets absorbed. In so doing, the EIT pixel provides a phase shift that is controlled based on where the off-resonance leg 507 is tuned, resulting in a 3-D image from the display.

Electrochemistry Example

In addition to the slow light propagation material, there are natural and man-designed materials that change their index of refraction when an electric field is applied to them. In general, the changing of the effective index of refraction occurs in the space of a few atoms well below the size of the wavelength of light. In one embodiment, the effective index of refraction of the pixel 210 is changed with the utilization of an electrochemical process. However, unlike the slow light propagation material, the electrochemical method requires a larger distance of travel through the pixel 210 to accomplish the phase shift. Therefore, the pixel 210 would have to be thicker than the slow light propagation medium.

In principal with electric fields, electrochemical and slow light propagation material, embodiments modify the phase of the photon as it interacts with the pixel. Similar in function to an LCD, except the molecules do not change, the components do. In one embodiment, with respect to molecular electronics, e.g., moving of the pixel, as described herein, it is possible for components of a molecule to change with respect to each other, e.g., dipole moments. In other words, one moiety of the molecule has a strong dipole moment and a non-rigid bond (having rotation capability). A strong electromagnetic field is then applied and the molecule will be reconfigured significantly. That is, the angles of the electron orbital will be changed, which will dramatically influence the interaction with light and parameters such as effective index of refraction.

Figure 6:
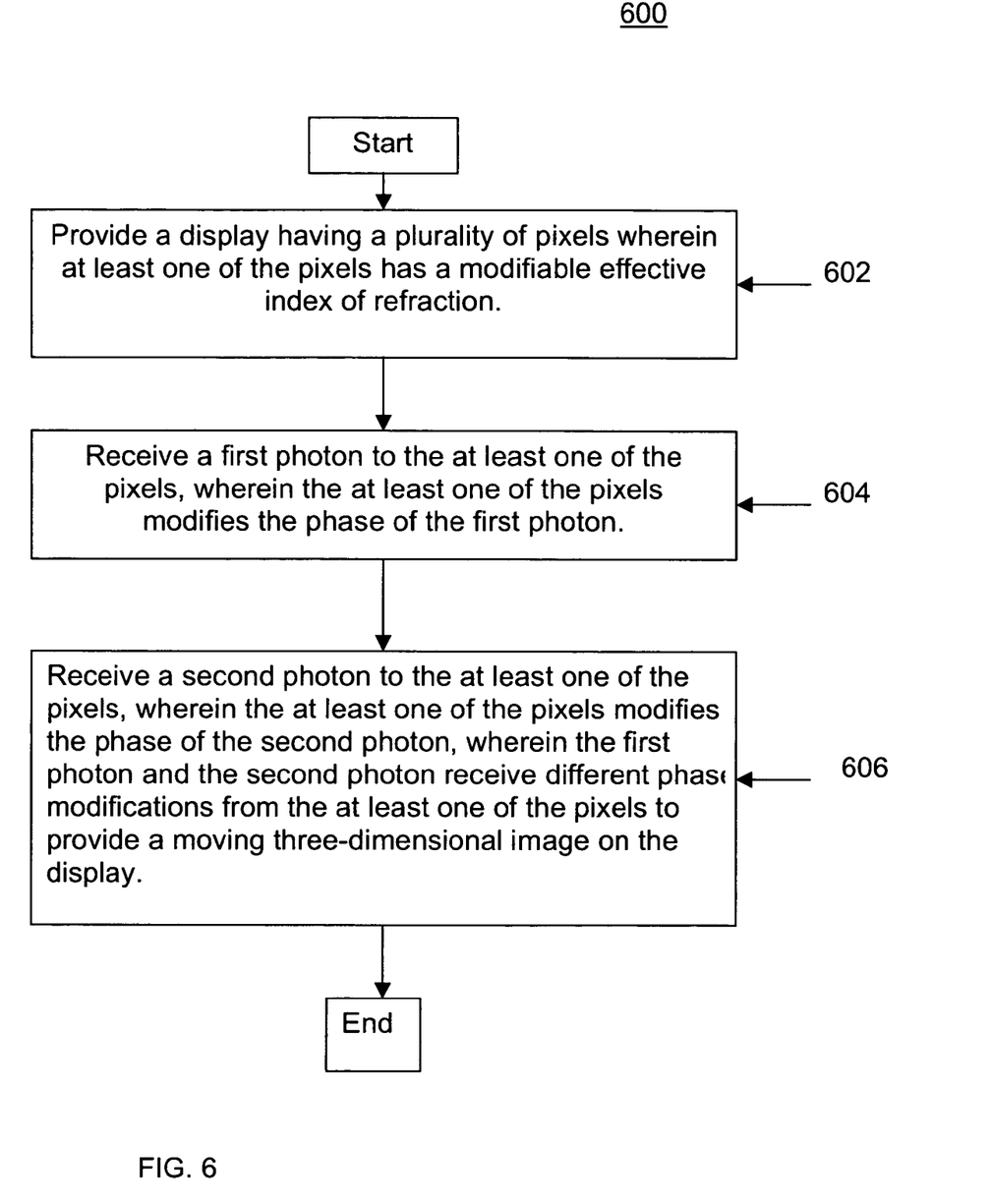
FIG. 6 is a flowchart of the steps for providing a three-dimensional moving image display in accordance with one embodiment of the present invention.

Referring now to FIG. 6, a flowchart 600 of the steps for providing a three-dimensional moving image display is shown in accordance with one embodiment of the present invention.

With reference now to step 602 of FIG. 6 and to FIG. 4, one embodiment provides a display 400 having a plurality of pixels 210 wherein at least one of the pixels 210 has a modifiable effective index of refraction. As described herein, the ability to modify the effective index of refraction numerous times a second will allow the display 400 to produce a three-dimensional moving image. In one embodiment, not all the pixels 210 in the display 400 are capable of modifying their effective index of refraction. In another embodiment, every pixel 210 in the display 400 has a modifiable effective index of refraction.

In another embodiment, a sub-pixel portion of at least one of the plurality of pixels 210C in the display 400 has a modifiable effective index of refraction. For example, pixel 210C provides a blue sub-pixel portion having a modifiable effective index of refraction for blue coherent light, a green sub-pixel portion having a modifiable effective index of refraction for green coherent light, and a red sub-pixel portion having a modifiable effective index of refraction for red coherent light.

With reference still to step 602 of FIG. 6 and now to FIG. 3, as described in detail herein, in one embodiment, a refractive index controller 318 is used for controlling the modifiable and reversible index of refraction of at least one of the pixels 210. The refractive index controller 318 is capable of modifying the index of refraction of the at least one of the pixels to manipulate the phase of a first photon to a first extent and manipulate the phase of a second photon to a second different extent.

In another embodiment, the refractive index controller 318 is used for controlling the modifiable and reversible index of refraction of at least one of the sub-pixels 210 (e.g., R, G or B). The refractive index controller 318 is capable of modifying the index of refraction of the at least one of the sub-pixels to manipulate the phase of a first photon to a first extent and manipulate the phase of a second photon to a second different extent.

With reference now to step 604 of FIG. 6 and to FIG. 3, one embodiment receives a first photon 306 to the at least one of the pixels (e.g., 210), wherein the at least one of the pixels 210 modifies the phase of the first photon resulting in photon 327. In one embodiment, the refractive index controller 318 utilizes an electric field to change the effective index of refraction of the at least one pixel 210. In another embodiment, the refractive index controller 318 utilizes an electrochemical stimulus to change the effective index of refraction of the at least one pixel 210.

In yet another embodiment, the refractive index controller 318 utilizes a slow light propagation material capable of changing its effective index of refraction for the at least one pixel 210. For example, utilizing an electromagnetic induced transparency (EIT) material as the slow light propagating material, or utilizing an alexandrite material as the slow light propagating material. In one embodiment, doping a $BeAl_2O_4$ crystal with $Cr^{3+}$ ions wherein the $Cr^{3+}$ ions replace the $Al^{3+}$ ions forms the alexandrite.

With reference now to step 606 of FIG. 6 and to FIG. 4, one embodiment receives a second photon 412B to the at least one of the pixels 210B, wherein the at least one of the pixels 210B modifies the phase of the second photon 412B. In one embodiment, a coherent light 440 (e.g., a laser) is utilized to provide the first photon 412A (or 414A) and the second photon 412B (or 414B) to the at least one of the pixels 210B-210C, wherein the first photon 412A and the second photon 412B receive different phase modifications from the at least one of the pixels 210B to provide a moving three-dimensional image on the display 400. In another embodiment, three coherent light sources 445 (e.g., red laser 445R, green laser 445G and blue laser 445B) are utilized to provide the first photon 414A and the second photon 414B to the at least one of the sub-pixels 210C.

As stated herein, in one embodiment, the display is a cathode ray tube (CRT) display. In another embodiment, the display is a liquid crystal display (LCD). In yet another embodiment, the display is any type of display that normally provides two-dimensional images.

Movement of the Pixel

Figure 7:
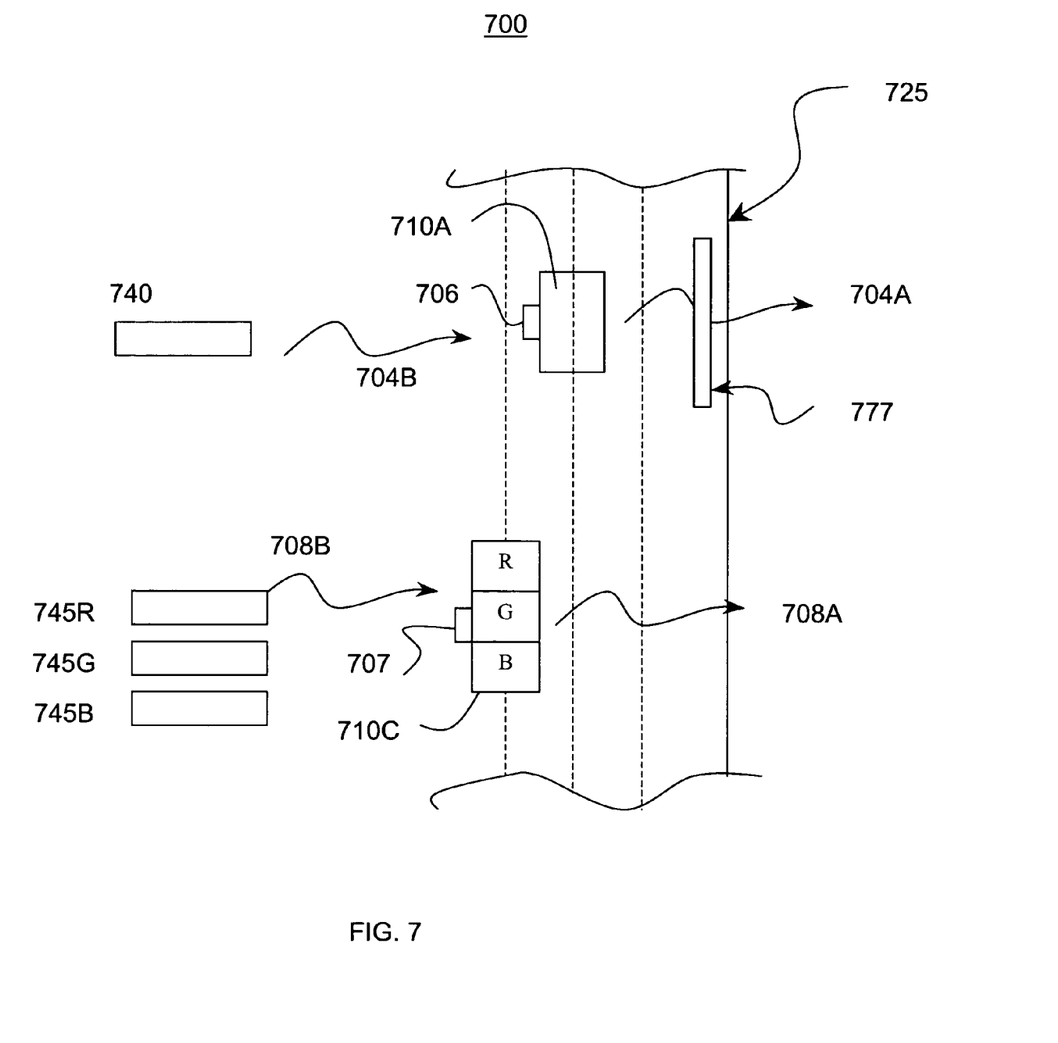
FIG. 7 is a side view diagram of a portion of an exemplary electronic display having a moving pixel grid in accordance with one embodiment of the present invention.

With reference now to FIG. 7, a side view diagram of a portion of an exemplary electronic display 700 having a moving pixel grid is shown in accordance with one embodiment of the present invention. That is, the pixel (e.g., 710A and/or 710C) is moved to provide changing phase information. In one embodiment, the pixel provides the phase shift with an electronic control signal, e.g., photonic, chemical, etc. For example, in one embodiment, utilizing a molecular crossbar protocol such as the protocols described in "Molecular Wire Crossbar Memory" of U.S. Pat. No. 6,128,214 issued Oct. 3, 2000 Assigned to the same Assignee and incorporated herein by reference.

In one embodiment, the molecular wire crossbar memory (MWCM) system includes a two-dimensional array of a plurality of nanometer-scale devices, each device having a junction formed by a pair of crossed wires where one wire crosses another and at least one connector species connecting the pair of crossed wires in the junction. The connector species comprises a bi-stable molecular switch. The junction forms either a resistor or a diode or an asymmetric non-linear resistor. The junction has a state that is capable of being altered by application of a first voltage and sensed by application of a second, non-destructive voltage. In one embodiment, the MWCM system is utilized to move the pixel 710A and/or 710C a small distance to change the distance the light travels, e.g., add a phase change. For example, if a sufficiently rigid screen 725 is built, that is a screen 725 having minimal vibration, then by the $X_1$-$Y_n$ selection of the pixels 710 (or 210 as shown in FIG. 2), monochromatic (three separate colors) pixels such as 710C or single color pixels such as 710A, could effectively provide a 3-D motion picture.

In other words, by changing the plane wave of light, by moving the pixel a fraction of a wavelength (e.g., up to $2\pi$), the phase of the photon (e.g., photons 704A and 708A) being output is changed and is no longer static for each photon leaving the pixel. In so doing, the third dimension is added to the normal two dimensions of the display 700 resulting in a 3-D moving picture. For example, by placing the MWCM controller (such as controller 706 or 707) in control of at least a few of the pixels 710 (including in one embodiment in the reflectors) and literally moving them (e.g., putting a voltage on them) by sometimes up to almost a full wave length, as shown the location of pixels 710A and 710C, a display having 3-D capabilities is realized. In one embodiment, the movement for each pixel 710 is a few hundred of nanometers up to one micron. That is, well within nanotechnology parameters.

In one embodiment, the movement is generated by piezoelectric devices 706 or 707, such as typical piezoelectric material lead zirconium titanate (PZT), to move the pixels nanometer stages (e.g., small amounts). In another embodiment, Micro-Electro-Mechanical Systems (MEMS) devices 706 or707 provide the movement. For example, methods based on a spring constant and a capacitive loading are used to move the pixels 710 or portions of the pixels 710 to provide a phase difference to the photons (e.g., 704 and 708). In yet another embodiment, the devices (e.g., controllers 706 and 707) moving pixels 710 may be a combination of the piezoelectric, MEMS and MWCW controllers. In one embodiment, the intensity of the light is not controlled, but only the phase of the light by modifying the distance the photon travels by moving the pixel. In another embodiment, the intensity may be controlled due to light source modulation (e.g., separately modulating intensity independent of phase-dependent devices).

Figure 8:
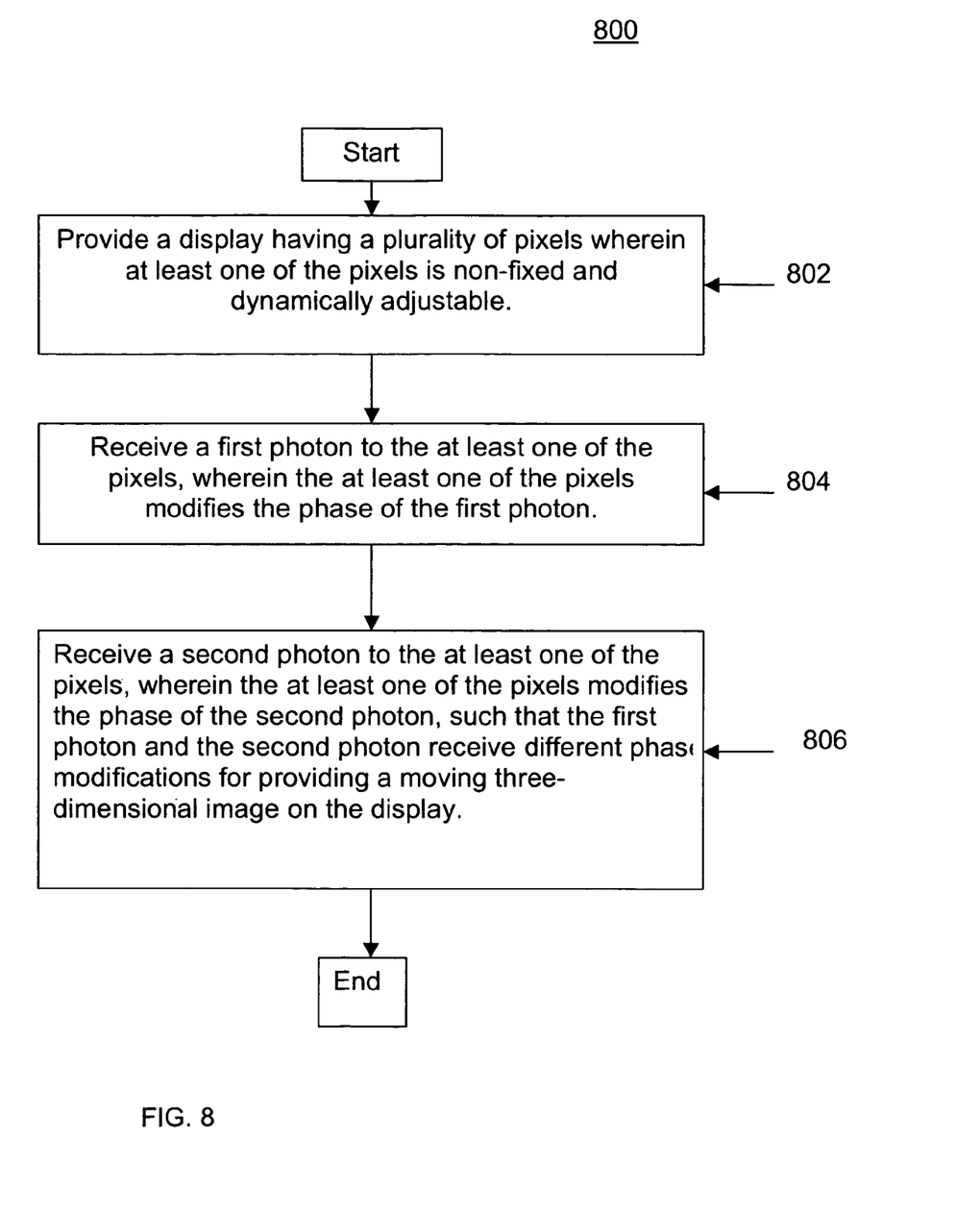
FIG. 8 is a flowchart of the steps for providing a three-dimensional moving image from a non-fixed pixel display in accordance with one embodiment of the present invention.

Referring now to FIG. 8, a flowchart 800 of the steps for providing a three-dimensional moving image from a non-fixed and dynamically adjustable pixel display 700 is shown in accordance with one embodiment of the present invention.

With reference now to step 802 of FIG. 8 and to FIG. 7, one embodiment provides a display 700 having a plurality of pixels 710 wherein at least one of the pixels 710 is non-fixed and dynamically adjustable. As described herein, the ability to move the pixel numerous times a second will allow the display 700 to produce a variable three-dimensional image. In one embodiment, not all the pixels in the display are non-fixed and dynamically adjustable. In another embodiment, every pixel in the display is non-fixed and dynamically adjustable.

In another embodiment, a sub-pixel portion of at least one of the plurality of pixels 710 in the display 700 is non-fixed and dynamically adjustable. For example, pixel 710C provides a blue sub-pixel portion being non-fixed and dynamically adjustable for blue coherent light, a green sub-pixel portion being non-fixed and dynamically adjustable for green coherent light, and a red sub-pixel portion being non-fixed and dynamically adjustable for red coherent light.

With reference now to step 804 of FIG. 8 and to FIG. 7, one embodiment receives a first photon 704A to the at least one of the pixels (e.g., 710A), wherein the at least one of the pixels 710A modifies the phase of the first photon 710A by adjusting position as described in detail herein. In one embodiment, the movement of the pixel 710A provides a dynamic adjustment to the phase of the photon 704A.

In one embodiment, a pixel controller (e.g., controllers 706 and 707) are utilized for controlling the at least one of the non-fixed and dynamically adjustable pixels 710. In one embodiment, the controller (e.g., 706 and 707) utilizes a molecular wire crossbar memory (MWCM) system to move the non-fixed and dynamically adjustable pixel 710. In another embodiment, the controller (e.g., 706 and 707) utilizes a piezoelectric device to move the non-fixed and dynamically adjustable pixel 710. In yet another embodiment, the controller (e.g., 706 and 707) utilizes a micro-eletro-mechanical system (MEMS) device to move said non-fixed and dynamically adjustable pixel 710.

With reference now to step 806 of FIG. 8 and to FIG. 7, one embodiment provides a second photon 704B to the at least one of the pixels 710A, wherein the at least one of the pixels 710A dynamically adjusts the phase of the second photon 704B. In one embodiment, a coherent light 740 (e.g., a laser) is utilized to provide the first photon 704A and the second photon 704B to the at least one of the pixels 710, wherein the first photon 704A and the second photon 704B receive different phase modifications from the at least one of the pixels 710A to provide a moving three-dimensional image. In another embodiment, three coherent light sources 745 (e.g., red laser 745R, green laser 745G and blue laser 745B) are utilized to provide the first photon 708A and the second photon 708B to the at least one of the sub-pixels 710C.

In another embodiment, the display 700 will include a combination of pixels described herein. That is, wherein at least one pixel of the display will have changing index of refraction capabilities as described herein and shown in FIG. 4 and at least one pixel of the display will be non-fixed as described herein and shown in FIG. 7. Additionally, in another embodiment, the display will contain at least one changing index of refraction pixel, at least one non-fixed pixel, and at least one standard fixed pixel (well-known in the art). As stated herein, in one embodiment, the display is a cathode ray tube (CRT) display. In another embodiment, the display is a liquid crystal display (LCD). In yet another embodiment, the display is any type of display which normally provides two-dimensional images.

Thus, embodiments of the present invention provide methods for providing a three-dimensional moving image from a non-fixed pixel display. Embodiments further provide dynamic, significant and rapid movement of a pixel and even sub pixel. In one embodiment, mechanical motion is utilized to add phase information to the photon leaving the pixel. In another embodiment, the rapid and local changes to the position of the pixel are also reversible. In other words, it is not just a photograph or still image, the image is a moving and changing image due to the rapid and reversible effective pixel movements.

Embodiments of the present invention are thus described. While the present invention has been described in particular embodiments, it should be appreciated that the present invention should not be construed as limited by such embodiments, but rather construed according to the following claims.

We claim:

1. A dynamic holographic display comprising:
   a display having a plurality of non-fixed and dynamically adjustable pixels; and a pixel controller dynamically modifying a relative phase of said plurality of non-fixed and dynamically adjustable pixels, said pixel controller moving the plurality of pixels to a first extent to dynamically change the relative phase for each of a first plurality of photons at each of said plurality of pixels and to a second different extent to dynamically change the relative phase for each of a second plurality of photons at each of said plurality of pixels to generate dynamic holographic imagery.

2. The display of claim 1 wherein every pixel in said display is non-fixed and dynamically adjustable.

3. The display of claim 1 wherein said pixel controller utilizes a molecular wire crossbar memory (MWCM) system to move said non-fixed and dynamically adjustable pixel.

4. The display of claim 1 wherein said pixel controller utilizes a piezoelectric device to move said non-fixed and dynamically adjustable pixel.

5. The display of claim 1 wherein said pixel controller utilizes a micro-eletro-mechanical system (MEMS) device to move said non-fixed and dynamically adjustable pixel.

6. The display of claim 1 farther comprising:
a sub-pixel portion in said display, said sub-pixel portion being non-fixed and dynamically adjustable; and
a sub-pixel controller for controlling at least one non-fixed and dynamically adjustable sub-pixel, said sub-pixel controller for moving at least one of the sub-pixels to a first extent to changing the phase of a first photon and to a second different extent to change the phase of a second photon.

7. The display of claim 6 wherein said sub-pixel being non-fixed and dynamically adjustable further comprises:
a blue sub-pixel being non-fixed and dynamically adjustable for blue coherent light;
a green sub-pixel being non-fixed and dynamically adjustable for green coherent light; and
a red sub-pixel being non-fixed and dynamically adjustable for red coherent light.

8. The display of claim 1 wherein said display is a cathode ray tube (CRT) display.

9. The display of claim 1 wherein said display is a liquid crystal display (LCD).

10. A method for providing a dynamic holographic moving image from a non-fixed pixel display comprising:
providing a display having a plurality of pixels; and
dynamically modifying a relative phase of a plurality of non-fixed and dynamically adjustable pixels, by moving the plurality of pixels to a first extent to dynamically change the relative phase for each of a first plurality of photons at each of said plurality of pixels and to a second different extent to dynamically change the relative phase for each of a second plurality of photons at each of said plurality of pixels to generate dynamic holographic imagery.

11. The method of claim 10 wherein every pixel in said display is non-fixed and dynamically adjustable.

12. The method of claim 10 wherein said pixel controller comprises:
a molecular wire crossbar memory (MWCM) system to move said non-fixed and dynamically adjustable pixel.

13. The method of claim 10 wherein said pixel controller comprises:
a piezoelectric device to move said non-fixed and dynamically adjustable pixel.

14. The method of claim 10 wherein said pixel controller comprises:
a micro-eletro-mechanical system (MEMS) device to move said non-fixed and dynamically adjustable pixel.

15. The method of claim 10 further comprising:
providing a sub-pixel portion in said display, said sub-pixel portion being non-fixed and dynamically adjustable; and
providing a sub-pixel controller for controlling at least one non-fixed and dynamically adjustable sub-pixel, said sub-pixel controller for moving at least one of the sub-pixels to a first extent to changing the phase of a first photon and to a second different extent to change the phase of a second photon.

16. The method of claim 15 wherein said sub-pixel being non-fixed and dynamically adjustable further comprises:
a blue sub-pixel being non-fixed and dynamically adjustable for blue coherent light;
a green sub-pixel being non-fixed and dynamically adjustable for green coherent light; and
a red sub-pixel being non-fixed and dynamically adjustable for red coherent light.

17. A method for manipulating the phase of the light from a plurality of non-fixed and dynamically adjustable pixels in a display to provide a dynamic holographic image comprising:
providing a display having a plurality of non-fixed and dynamically adjustable pixels;
dynamically modifying a relative phase of a first plurality of photons at each of said plurality of said pixels; and
dynamically modifying a relative phase of a second plurality of photons at each of said plurality of said pixels, said first plurality of photons and said second plurality of photons receiving different relative phase modifications to generate dynamic holographic imagery.

18. The method of claim 17 wherein every pixel in said display is non-fixed and dynamically adjustable.

19. The method of claim 17 further comprising:
a pixel controller for controlling said at least one of said non-fixed and dynamically adjustable pixel.

20. The method of claim 19 wherein said pixel controller comprises:
a molecular wire crossbar memory (MWCM) system to move said non-fixed and dynamically adjustable pixel.

21. The method of claim 19 wherein said pixel controller comprises:
a piezoelectric device to move said non-fixed and dynamically adjustable pixel.

22. The method of claim 19 wherein said pixel controller comprises:
a micro-eletro-mechanical system (MEMS) device to move said non-fixed and dynamically adjustable pixel.

23. The method of claim 17 further comprising:
providing a display having a plurality of sub-pixels, wherein at least one of said sub-pixels is non-fixed and dynamically adjustable, said non-fixed and dynamically adjustable sub-pixel capable of changing the phase of a first photon to a first extent and changing the phase of a second photon to a second different extent.

24. The method of claim 23 wherein said sub-pixel being non-fixed and dynamically adjustable further comprises:
a blue sub-pixel being non-fixed and dynamically adjustable for blue coherent light;
a green sub-pixel being non-fixed and dynamically adjustable for green coherent light; and
a red sub-pixel being non-fixed and dynamically adjustable for red coherent light.

* * * * *

UNITED STATES PATENT AND TRADEMARK OFFICE
CERTIFICATE OF CORRECTION

| | | |
|---|---|---|
| PATENT NO. | : 7,511,725 B2 | Page 1 of 1 |
| APPLICATION NO. | : 11/128085 | |
| DATED | : March 31, 2009 | |
| INVENTOR(S) | : Philip J. Kuekes et al. | |

It is certified that error appears in the above-identified patent and that said Letters Patent is hereby corrected as shown below:

In column 11, line 19, in Claim 5, delete "micro-eletro-mechanical" and insert -- micro-electro-mechanical --, therefor.

In column 11, line 21, in Claim 6, delete "farther" and insert -- further --, therefor.

In column 12, line 1, in Claim 14, delete "micro-eletro-mechanical" and insert -- micro-electro-mechanical --, therefor.

In column 12, line 48, in Claim 22, delete "micro-eletro-mechanical" and insert -- micro-electro-mechanical --, therefor.

Signed and Sealed this

Twenty-seventh Day of October, 2009

David J. Kappos
*Director of the United States Patent and Trademark Office*